W. N. PARRISH.
WIRE FENCE MACHINE.
APPLICATION FILED JULY 15, 1910.
984,021.
Patented Feb. 14, 1911.
6 SHEETS—SHEET 1.
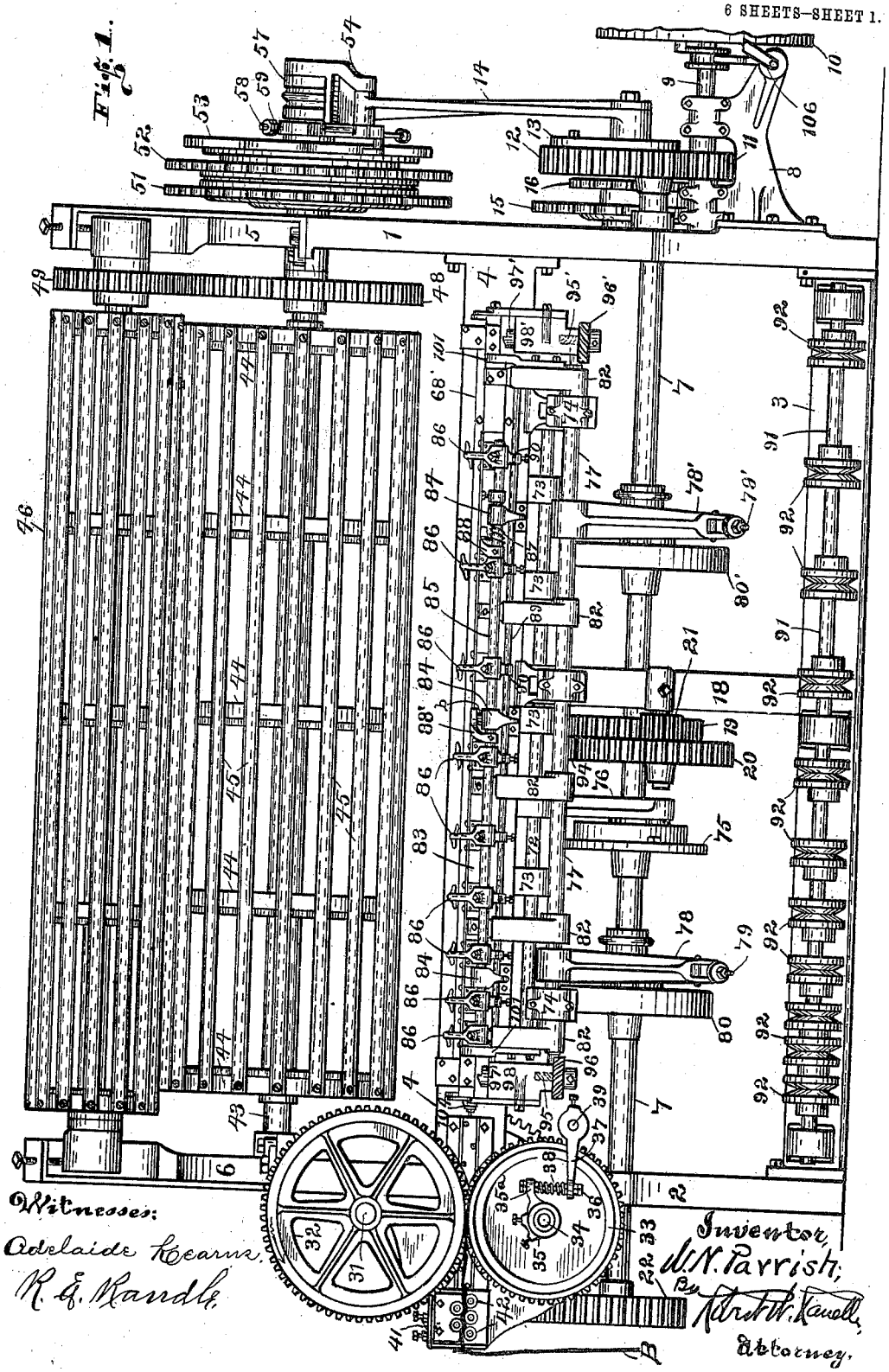

W. N. PARRISH.
WIRE FENCE MACHINE.
APPLICATION FILED JULY 15, 1910.
984,021.
Patented Feb. 14, 1911.
6 SHEETS—SHEET 2.
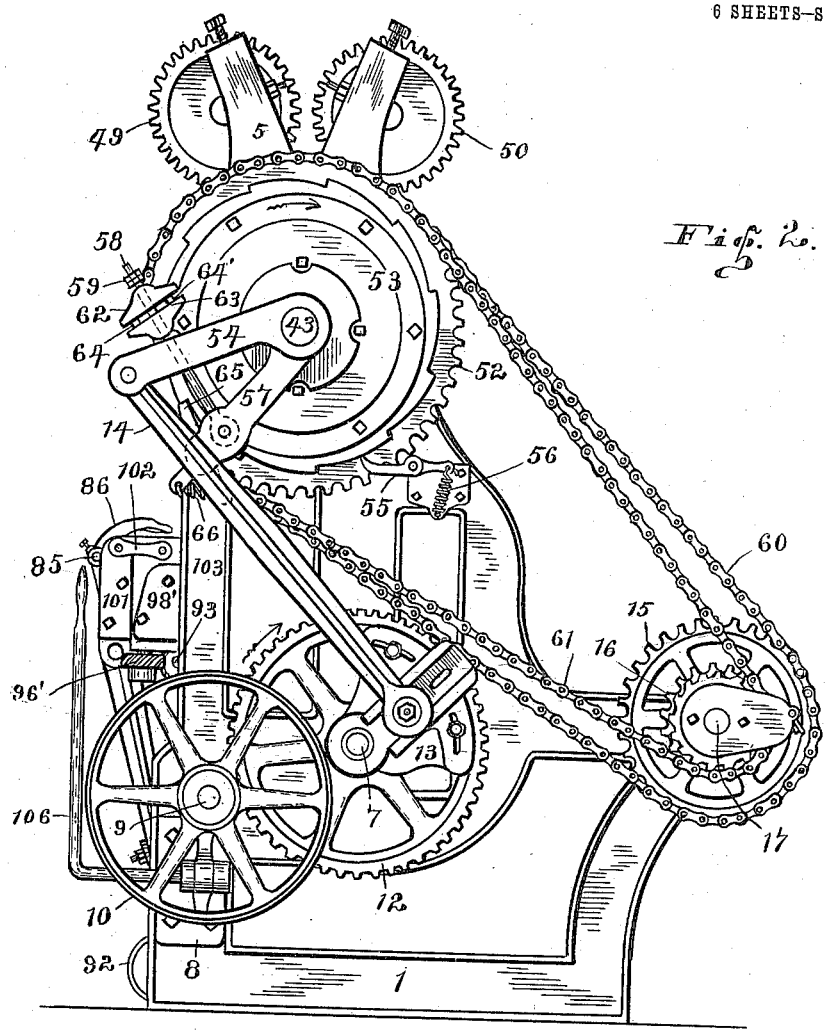
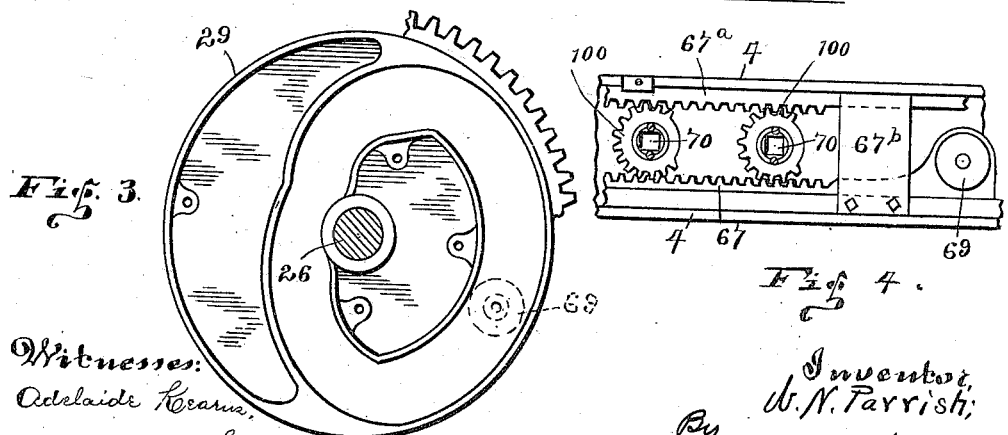
Witnesses:
Adelaide Kearns
R. A. Randle
Inventor
W. N. Parrish
By Robert W. Randle
Attorney W. N. PARRISH.
WIRE FENCE MACHINE.
APPLICATION FILED JULY 15, 1910.
984,021.
Patented Feb. 14, 1911.
6 SHEETS—SHEET 3.
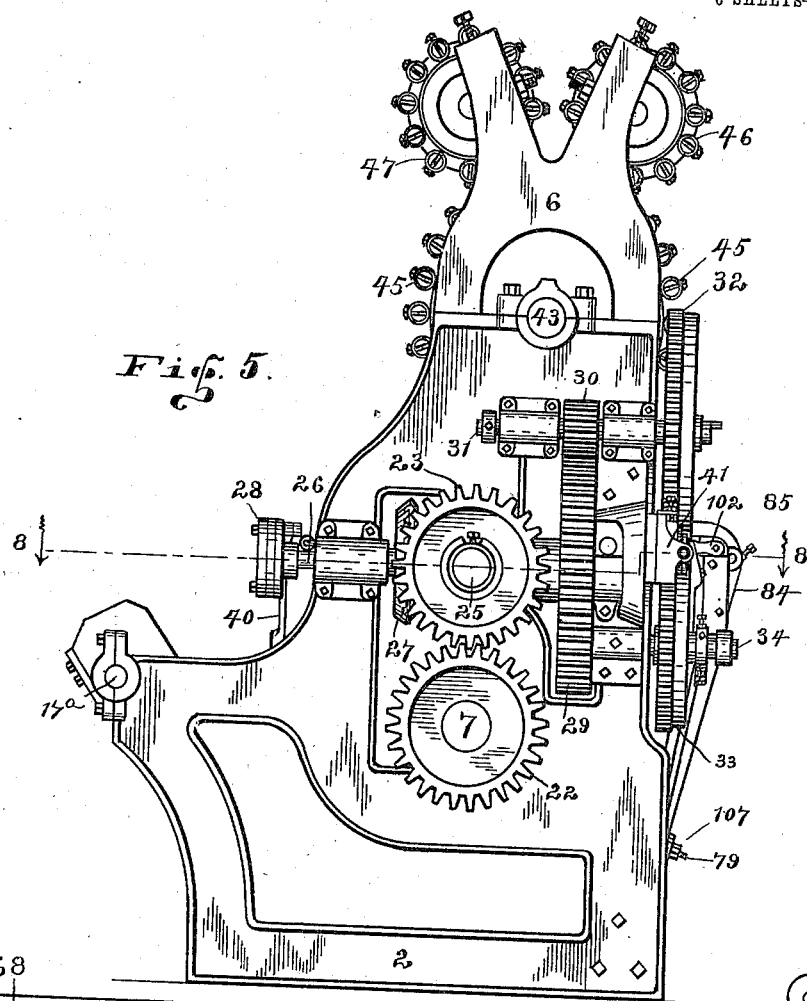
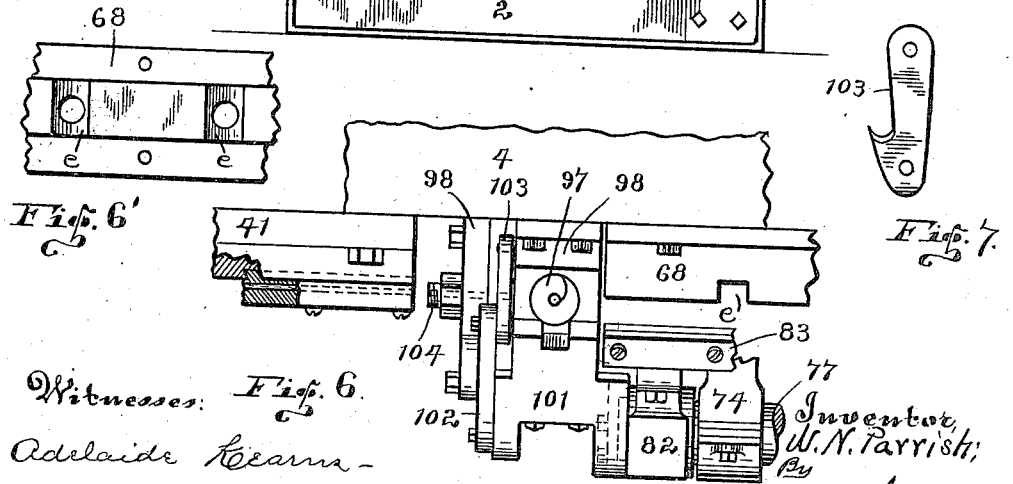
Witnesses:
Adelaide Kearns
R. E. Randle
Inventor,
W. N. Parrish,
By Robt. E. Randle
Attorney.

W. N. PARRISH.
WIRE FENCE MACHINE.
APPLICATION FILED JULY 15, 1910.
984,021.
Patented Feb. 14, 1911.
6 SHEETS—SHEET 4.
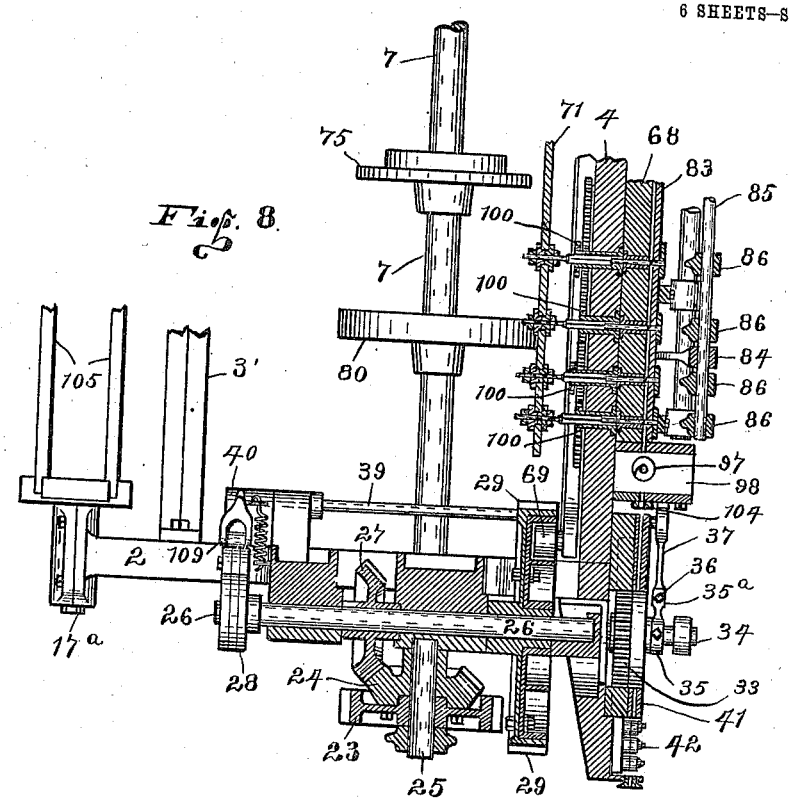
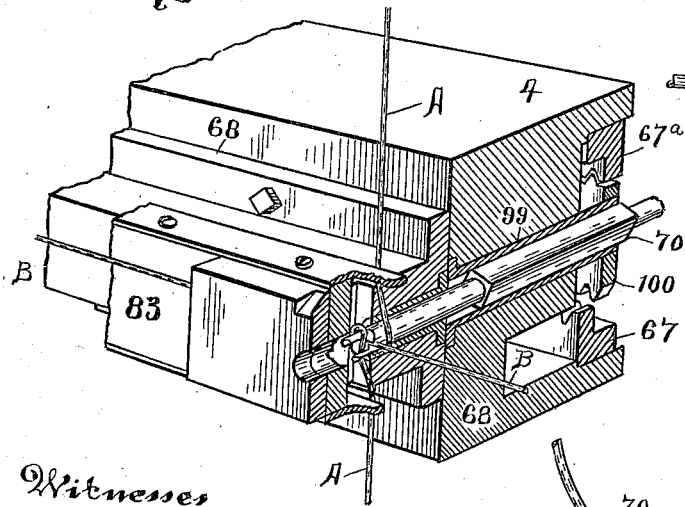
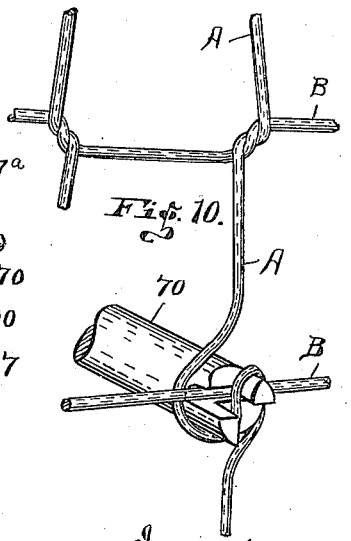
Witnesses
Adelaide Kraus
R. E. Randle
Inventor
W. N. Parrish
Robert W. Randle
Attorney

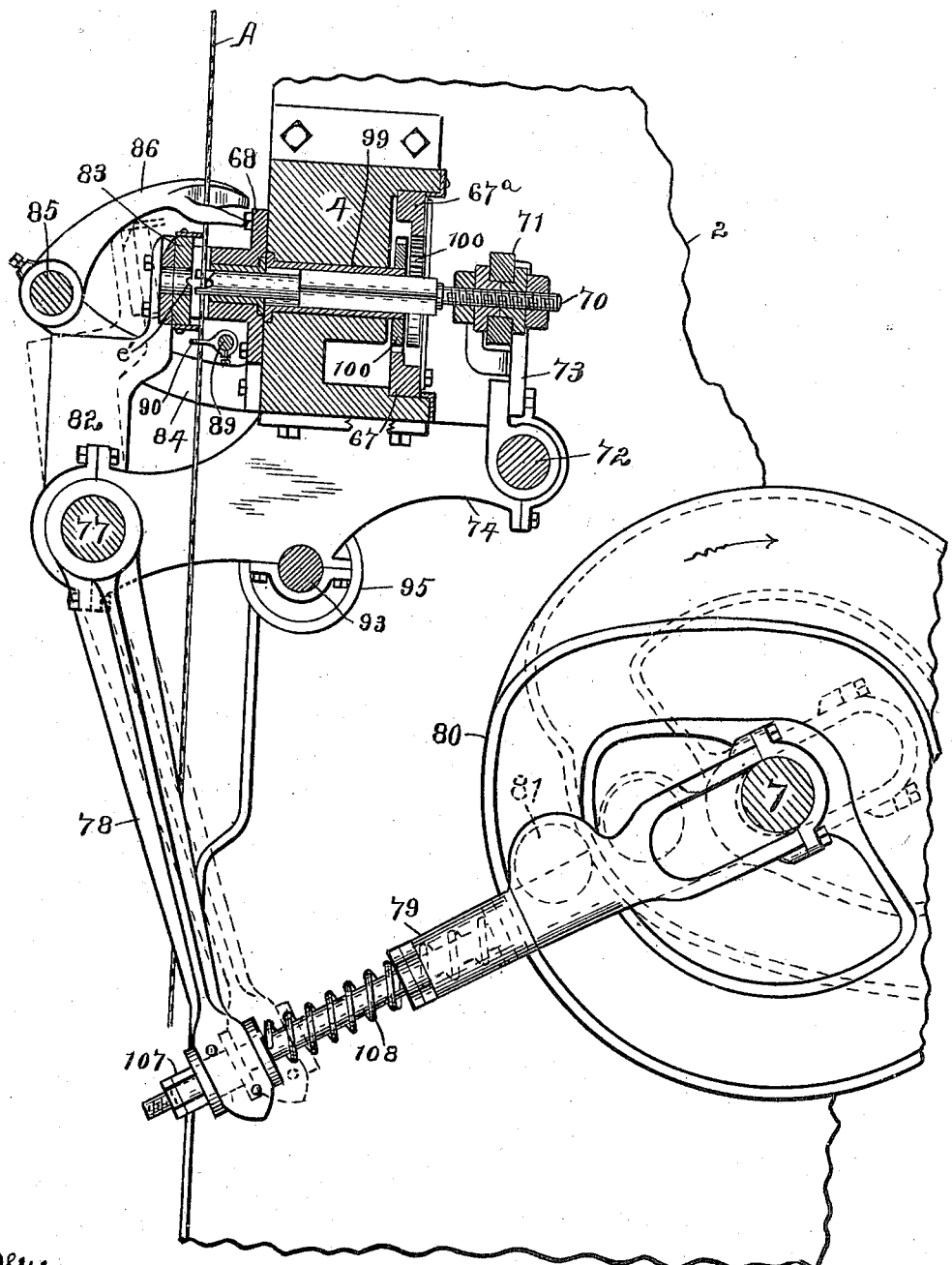

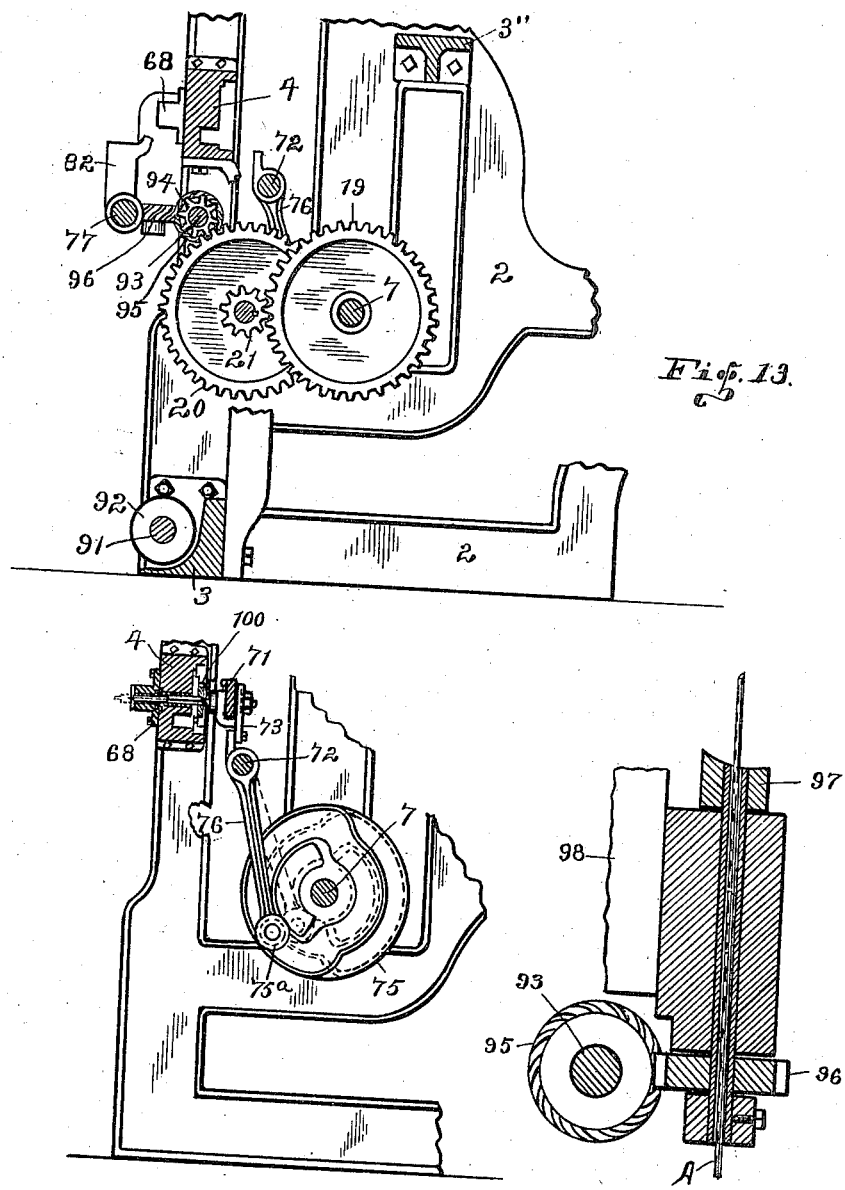

UNITED STATES PATENT OFFICE.

WILLIAM N. PARRISH, OF RICHMOND, INDIANA.

WIRE-FENCE MACHINE.

984,021. Specification of Letters Patent. Patented Feb. 14, 1911.

Application filed July 15, 1910. Serial No. 572,103.

*To all whom it may concern:*

Be it known that I, WILLIAM N. PARRISH, a citizen of the United States, residing in the city of Richmond, in the county of Wayne and State of Indiana, have invented certain new and useful Improvements in Wire-Fence Machines, of which the following is a true and comprehensive specification.

My present invention has for its object, among other things, to greatly simplify the construction and arrangement of the parts thereof; to control the material-feeding mechanism with absolute exactitude whereby the several operations will follow each other with precision, and by which the finished product will be mechanically perfect.

The object of my invention, broadly speaking, is to provide an efficient wire fence machine which will be strong and durable in construction, easily controlled by the operator, operable with a minimum of power applied thereto, and which can be manufactured and sold at a comparatively low price, but at the same time providing a machine capable of producing a maximum amount of finished product in a minimum amount of time.

Other objects and particular advantages of my invention will be brought out in the course of the following description, and that which is new will be set forth in the appended claims.

The invention consists of the sundry devices and combinations and the arrangements of the parts, substantially as hereinafter more fully disclosed and particularly pointed out.

This present invention relates to a machine for making that type of square mesh fencing in which the cross or stay wires each consist of a single length of wire spanning the spaces between the line-wires, and in which the line-wires and the stay-wires are connected at each intersection thereof, and with the ends of the stay-wires coiled around the outer or marginal line-wires, the line-wires and the stay-wires being arranged at right-angles to each other.

The manner in which I provide the means for accomplishing the several desiderata will appear from the following detail description of the machine itself, which embodies one practical method for carrying out my invention and the operation thereof to produce the desired results.

The preferred manner for carrying out the objects of my invention, and of introducing the several improvements over that heretofore accomplished in this line, is shown in the accompanying drawings, in which—

Figure 1 shows a front elevation of my invention complete. Fig. 2 shows a right-hand end elevation of my machine. Fig. 3 shows an inner face view of the combined gear and cam wheel which operates the racks controlling the twisters. Fig. 4 is a detail showing a portion of the rack by which the twisters are rotated. Fig. 5 is a left-hand end elevation of my machine. Fig. 6 is a detail showing a plan view of the left-hand marginal twister, and other parts and portions of parts located near thereto. Fig. 6' is a detail view showing a portion of the face of the face-plate. Fig. 7 is a detail view of the cutter for severing the stay-wires. Fig. 8 is a sectional plan of the left-hand portion of the machine as taken on the line 8—8 of Fig. 5. Fig. 9 is an isometrical view of the bed-plate and the face-plate in cross section, also showing one of the loopers in position. Fig. 10 is a detail showing the head portion of one of the loopers in position immediately after forming a loop in a line-wire, and showing the stay-wire as having been inserted through the loop. Fig. 11 is an end or face view of one of the loopers, showing same in operative position in connection with a line-wire and a stay-wire. Fig. 12 is a view taken at right-angles to the axial direction of the machine, showing certain of the parts in cross-section and certain other parts in elevation. Fig. 13 shows an elevation of a portion of one end of the machine, also showing the bed-plate and various shafts in cross section. Fig. 14 is a detail showing the bed-plate and the main shaft in cross section, and showing one of the means for actuating the gate. And Fig. 15 is a detail view showing one of the marginal twisters in vertical section.

Similar indices denote like parts throughout the several views.

With all of the above designated views in mind I will now take up a description thereof in concrete detail, in which I will describe the several parts and the operations thereof as briefly and as comprehensively as I may.

The frame of my machine is composed of the two end members 1 and 2, right and left respectively. The end members are rigidly connected together by means of the two sills 3 and 3' located at the floor-line; by the bed-plate 4 located near the center vertically of the machine, and by the tie 3'' located in the rear of the bed-plate, all in addition to other incidental means, as various shafts, which will hereinafter be referred to in progressive sequence.

Mounted on top of the respective members 1 and 2 are the auxiliary end members 5 and 6, which form upward continuations of the main members to which they are removably connected as indicated.

Numeral 7 denotes the main shaft, which is mounted in suitable boxings carried by the members 1 and 2, and it is located below and to the rear of the bed-plate 4, and extends through and beyond the members 1 and 2 at each end of the machine.

Mounted to the outer face of the lower forward portion of member 1 is the bracket 8 which carries the pulley shaft 9, which latter carries the pulley 10. Said pulley 10 is adapted to be thrown into and out of gear and through which power may be applied to the entire machine. Said shaft 9 carries a pinion 11 which meshes with the large gear wheel 12, the latter being secured to said shaft 7.

Adjustably secured on the face of the gear wheel 12 is the plate 13 which carries an adjustable axle on which is mounted the lower end of the arm 14.

The two sprocket wheels 15 and 16 are mounted on the stub-shaft 17 carried by the rearwardly projecting portion of member 1, as shown in Fig. 2, and they will be further referred to hereinafter.

Connecting the sill 3 and the bed-plate 4 near the center of the machine is the hanger 18 which has a rearward projection carrying a boxing in which operates the center of the shaft 7. Secured on shaft 7 near the left hand side of said hanger 18 is a gear-wheel 19.

Numeral 20 denotes a gear wheel having a pinion 21 secured thereto and concentric therewith, same being mounted on a suitable axle carried by the hanger 18 and extending to the left therefrom. Said pinion 21 meshes with the gear-wheel 19 as indicated in Fig. 1.

Mounted on the left-hand end of shaft 7 is the gear wheel 22 which meshes with the gear-wheel 23, the latter having a miter-gear 24 secured to its rear face and located concentric therewith. The wheels 23 and 24 are secured together and are revolubly mounted on the axle stem 25. Mounted in suitable boxings carried by the left-hand face of member 2 is the shaft 26 which is located at right-angles to shaft 7 and it is also located on same plane as is said stem or axle 25. Mounted on shaft 26 is the miter-gear 27 which meshes with the miter-gear 24.

Mounted on the rear end of the shaft 26 is the adjustable peripheral cam 28. Mounted on the forward end of shaft 26 is the combined gear and cam wheel 29 which is shown in detail in Fig. 3.

Numeral 30 denotes a pinion which meshes with wheel 29, as in Fig. 5, and it is secured to shaft 31, the latter being carried by boxings secured to the face of the end member 2 as in Fig. 5. Secured on the forward extension of shaft 31 is the wheel 32 one portion of whose face is provided with gear teeth and the other portion thereof is smooth, same being for the purpose hereinafter explained. Wheel 33 is located directly below and parallel with the wheel 32, with which it meshes, the smooth faces of the two wheels, 32 and 33, being adapted to be contacted or spaced apart with relation to each other, as will be explained. Said wheel 33 is adapted to have a slight vertical movement whereby the smooth faces of said wheels 32 and 33 may be moved toward or from each other. Said wheel 33 is mounted to the shaft 34 by means of an eccentric 35 which when slightly turned raises or lowers the wheel 33. Said eccentric has a finger 35ª through which is loosely disposed the bolt 36. Said bolt extends down through the finger 37. Coiled around bolt 36 and normally forcing said fingers 35ª and 36 apart is the helical spring 38. Said finger 37 is secured to the forward end of bar 39. Secured on the rear end of bar 39 is the arm 40 which carries a roller 109 adapted to travel on the periphery of cam 28, whereby as the cam 28 revolves the smooth faces of wheels 32 and 33 will be alternately moved toward and from each other.

Carried by the forward portion of member 2, and the bed plate 4, and projecting to the left is the guide plate 41, the outer portion of which carries a series of rollers 42 between which the stay-wire travels, passing through a channel formed in the guide-plate 41 therefor, the same being in alinement with the peripheral contact of wheels 32 and 33 (Fig. 1). Numeral 43 denotes the main bulldozer shaft which is mounted in suitable boxings on the upper ends of members 1 and 2. Carried by shaft 43 are a plurality of disks 44 which have secured thereto in their peripheries and extending parallel to shaft 43, a number of tubes, pipes or rods 45 spaced apart forming the periphery of the main bulldozer wheel as shown.

The upper portions of members 5 and 6 are forked and in each of these forks are adjustably mounted the bearings for the two smaller bulldozer wheels or drums 46 and 47 which are identical with each other, and they are also like the larger bulldozer wheel except that they are of smaller diameter. The pipes or bars of the bulldozer wheels 46 and 47 mesh with the pipes or bars of the larger bulldozer wheel. Mounted on the shaft 43 is the gear wheel 48 which is of the same diameter as the larger bulldozer wheel. Also mounted on the shafts of the bulldozer wheels 46 and 47 are the respective gear wheels 49 and 50 which mesh with the gear wheel 48 and by which means the three members of the bulldozers are operated in unison.

Mounted on shaft 43, to the right of member 1, are the two frictional contact sprocket wheels 51 and 52, and connected therewith is the ratchet disk 53. Mounted on the outer end of the shaft 43 is the arm 54 to the outer end of which is pivoted the arm 14.

Numeral 55 denotes a pawl operative on the ratchet wheel 53, being held in contact by the spring 56. Also secured on shaft 43 is the arm 57. Pivoted on the outer portion of arm 57 is the rod 58 which passes through an aperture therefor in arm 54, the outer end of said rod being threaded and provided with the nuts 59.

The sprocket wheels 51 and 15 are connected by the sprocket chain 60, while the sprocket wheels 52 and 16 are connected by sprocket chain 61, the purpose of these being to operate the reel, hereinafter explained.

The two jaws 62 and 63 operate loosely on the rod 58, one of said jaws contacting with arm 54 and the other with the nuts 58, and the two jaws are held resiliently apart by rubber cushions 64 and 64'.

Pivoted on the inner face of arm 57 is the dog 65 which is normally held in engagement with the ratchet disk 53 by the coil-spring 66.

The bed-plate 4 is formed with a comparatively large channel extending longitudinally of and formed in its rear face, in which channel is located a double offset rack, having the two members 67 and 67ª spaced apart but they are rigid with relation to each other, being connected by ties as, for instance, the tie 67ᵇ in Fig. 4, there being a similar tie, not shown, located near the other end of the rack. The members 67 and 67ª are offset laterally with relation to each other, as indicated in Fig. 9. Secured on the forward face of the bed-plate 4 is the face-plate 68.
A roller 69 is mounted on the left-hand end of said rack 67, which roller is adapted to travel in the cam-channel of the wheel 29, as in Fig. 8, whereby said rack is given a right and left reciprocating motion as the machine is operated.

A plurality of apertures are formed horizontally through the bed-plate, continuing through the face-plate 68, in each of which operates a looper or loop former 70, there being one looper for each intermediate line-wire in the fence to be made. The rear end of each of said loopers is secured in the bar 71 as indicated in Fig. 12.

Numeral 72 denotes a rocking shaft to which the bar 71 is connected by a plurality of hangers 73. Said shaft 72 is carried in boxings carried by the hangers 74, the latter being secured to the underside of the bed-plate 4, as in Fig. 12.

Numeral 75 denotes a cam carried on shaft 7 and it has a channel cam in one of its faces in which operates a roller 75ª carried by the lower end of arm 76, the latter being secured to shaft 72 (Fig. 14) whereby the bar 71 is moved forward and backward as the cam 75 revolves.

Mounted in suitable boxings in the forward portion of hangers 74 is the shaft 77. Secured to and extending downward and rearward from shaft 77 are the two arms 78 and 78'. Resiliently connected to the lower ends of arms 78 and 78' are the pitmen 79 and 79', respectively, which are yoked over the shaft 7 as in Fig. 12, each being in juxtaposition to the face of the respective cams 80 and 80'. Each of the pitmen 79 and 79' carries a roller (as the roller 81 shown in dotted lines in Fig. 12) whose travel in the cam channels of the respective cam-wheels 80 and 80' is such that as the machine operates the pitmen are moved forward and backward thereby rocking the shaft 77. The two cams 80 and 80' and their mechanism just described are duplicates of each other, there being two of these mechanisms in order to give greater strength, they being spaced apart as indicated in Fig. 1. Secured to and extending upward from shaft 77 are a plurality of arms or hangers 82.

Numeral 83 designates the gate, which in fact is a simple bar, carried by the hangers 82 parallel with the bed-plate and directly in front of the face-plate 68, there being apertures formed through the gate opposite each of the apertures in the bed-plate and the face-plate and corresponding and registering therewith. The gate 83 is made slightly wider than is the face plate 68 with which it is adapted to contact. Secured on the upper and the lower edges of the gate 83 are strips, as shown in Fig. 12, which strips project slightly rearward beyond the face of the gate, therefore projecting rearward beyond the face of the face-plate when the gate is closed thereagainst. Vertical channels are formed in the face of the face-plate, there being one of such channels formed across the face-plate at each place where the loopers project through, the base of said channels being substantially in alinement with the rear edges of said strips, above referred to as being secured on the edges of the gate, and the purpose of the above will hereinafter be made clear. It will now be apparent that when the cams 80 and 80' are revolved the gate 83 will alternately be moved toward and away from the face-plate, for the purposes hereinafter set forth.

Extending forward and slightly upward from the lower edge of the front of the bed-plate are a plurality of hangers 84 which carry the shaft 85. Secured on shaft 85 are a plurality of hands 86 having fingers projecting rearwardly over the forward face of the face-plate as in Fig. 12, there being one of said hands located over each of said loopers 70. Said hands move together, they being free to fall by gravity to the position shown in Fig. 12, however they are positively but resiliently caused to assume that position by reason of helical spring 87 which is coiled around shaft 85 and is secured, under tension, to the hanger 84 and to the collar 88, which latter is secured to said shaft 85. Another collar 88' (Fig. 1), having a flange extending over the adjoining hanger 84, is secured to shaft 85, there being a rubber cushion "$b$" located between said flange and said hanger in order to prevent the fingers from striking too sharply.

Secured along underneath the forwardly projecting portion of the face-plate 68 is a rod 89 which carries a plurality of eye-clips 90, the eyes of which are located directly below said apertures through the bed-plate and they are also located in alinement with the forward edge of the face-plate, as indicated in Fig. 12.

Carried by suitable hangers directly in front of sill 3 is the shaft 91 on which are mounted pulleys 92, there being one of such pulleys directly below each of said loopers. Revolubly mounted in suitable boxings carried by the hangers 74 is shaft 93 on which is secured the pinion 94, which latter meshes with the gear 20 above referred to. Secured on the ends of shaft 93 are miter-gears 95 and 95' which mesh at right-angle with the corresponding miter-gears 96 and 96', respectively, as indicated in Fig. 1. Said gears 96 and 96' are secured on the lower end of the marginal twisters 97 and 97', respectively, which are revolubly mounted in the stationary blocks 98 and 98', respectively, the same being secured to the bed-plate 4 near the end portions thereof. Located in each of said apertures extending horizontally across through the bed-plate is a spool or thimble 99 which thimbles are revolubly mounted therein as indicated in Fig. 9, they being prevented from moving endwise by reason of the flange formed around on their forward ends, which flange is countersunk in the face of the bed-plate and behind the face-plate 68, all as clearly indicated in Fig. 12. On the rear ends of each of said thimbles 99 is secured a gear wheel 100 through each of which extends the square portion of one of the loopers 70 whereby one of the loopers 70 and one of the gears 100 are adapted to be rotated together.

It is essential that each alternate gear 100 be located farther to the rear than the others whereby each alternate gear 100 is in mesh with the upper members 67ª of the rack, while each of the other alternate gears 100 is in mesh with the lower member 67 of the rack, from which it is manifest that as the rack is moved endwise that each alternate looper will rotate in one direction while each of the other alternate loopers rotates in the opposite direction.

It should be noticed that while the gears 100 can not be moved forward or backward, yet the loopers 70 may be moved endwise, forward and backward, for the purpose presently appearing.

Secured to each of the outer hangers 82 is an arm 101 which extends upwardly and outwardly to the right and the left, respectively. Referring more particularly to the left-hand end of the machine it will be noticed in Fig. 6 that a link 102 is mounted on the side of arm 101, that a cutter (Fig. 7) is pivoted to the side of block 98, and that the link 102 and the cutter 103 are pivoted together whereby the cutter 103 is given a shearing contact on the inner face of block 98 whenever the gate is operated, and said shearing contact will be directed across the wire aperture which is formed through the thimble 104, shown in Figs. 1, 6 and 8. Said link and cutter also prevent the gate 83 from opening too far, and for this reason alone a similar link and cutter (or two links) are located in like manner at the right-hand side of the machine.

The right-hand portion of the reel is shown in Fig. 2 and it has been referred to above. It will be seen that the left-hand portion of the reel is shown in Fig. 5, in which 17ª denotes a stub-shaft corresponding to stub 17. Each of said stub shafts carries an inwardly directed head which heads are adapted to carry the removable rails 105, on which the finished product is to be wound as it is manufactured.

Numeral 106 denotes a lever for throwing the machine into and out of gear with relation to the power applied.

In Fig. 12 I desire to direct attention to the fact that the forward portion of pitman 79 is arranged to freely operate in a large aperture in the lower end of the arm 78, there being a nut 107 on the outer end portion of the pitman, and a coil spring 108 is located around the pitman which spring is compressed between the rear face of the arm 78 and a shoulder formed in the pitman, all substantially as indicated, the purpose of this last-named construction being to cushion the gate whereby the gate will contact resiliently with the face of plate 68 when the machine is in operation.

It should be noticed that the operative ends of the loopers 70 are formed with offset shoulders and with two projecting prongs or fingers, substantially as shown in Fig. 10.

In order to more fully make clear certain features of my invention and the advantages thereof it will be necessary to follow certain of the operations of the machine in making wire fence. Before commencing operation the machine is "threaded" that is, the intermediate line-wires A are brought up around and back of the intermediate pulleys 92, each line-wire being brought from a different source of supply, the line wires being spaced apart as desired for the fence to be made. The marginal line-wires are directed in the same manner as the intermediate wires except that they are carried upward through the marginal twisters as shown in Fig. 15 and then upward to the bulldozer. Following one of the intermediate line wires—it is carried upward through its eye-clip 90, and then on upward to the bulldozer, which of course brings it directly across the face of the face-plate and opposite one of the loopers. The line wires are then carried over the larger bulldozer drum, the smaller bulldozer drums gripping the wires and pressing them against the large drum and forming crimps therein. From the bulldozer the line wires are carried down and secured to the reel to be wound thereon as the machine advances. The stay-wire is brought from a single source of supply, the end thereof being inserted between the rollers 42 which straighten the wire which holds it under proper tension for delivering. The stay-wire is fed through an aperture therefor in the guide-plate 41 which carries it between the smooth faces of the wheels 32—33, from which it has a direct path, through the thimble 104, across the faces of all of the loopers, over the marginal twisters, to the farther end of the machine, there being a channel e' formed in the contact face of the gate 83, indicated in Fig. 12, and an oppositely disposed channel e is formed in the contact face of the face-plate 68, indicated in Figs. 6 and 6', through which the line-wire may slide when the gate is closed. The shooting of the stay wire across the machine is caused by the two wheels 32 and 33 gripping upon the wire and as said wheels operate with considerable speed they shoot the stay wire to position, and then loosen their grip thereon until again required. Immediately prior to the insertion of the stay-wire as above stated the cam 75 operating on arm 76 and shaft 72 has caused the bar 71 to move forward, moving the faces of all of the loopers into engagement with their respective line-wires A. Immediately following this last operation the cam in wheel 29 operating through roller 69 throws the rack endwise to the right, which, manifestly, will result in the prongs of the several loopers engaging their respective line-wires and forming loops therein, as indicated in Figs. 9, 10 and 11, the gate at this time being closed in order to complete the channel for the stay-wire to pass through. Now immediately following this last operation will occur the shooting of the stay-wire as above described, the stay-wire being compelled to pass through all of the loops formed by the loopers, as indicated in last-named views. As each alternate looper is turned oppositely to that adjoining, it is apparent that said loops will be turned alternately to the right and to the left. Following the insertion of the stay-wire the cam 29 will cause the loopers to be drawn to the rear, stripping the wires therefrom, after which the rack will move to the left turning the loopers back as before. Also following the insertion of the stay-wire the gate 83 will be opened which will cause the cutter 103 to sever the stay-wire at that point, and at the same time the marginal twisters will engage the ends of the stay-wire and twist them around the marginal line-wires. Following the above the arm 14 will turn the bulldozer and the reel one step, which will pull the line-wires upward the distance required, thereby removing the stay-wire just made from its position between the face-plate and the gate. As the line-wires move upward they of necessity pass between the fingers of the hands 86, the fingers thereof engaging the ties last made as they pass upward and spacing them accurately with relation to each other, allowing them to pass only under proper strain to give them the proper form, and after the ties have passed on upward said hands drop back as before, but always with the fingers of each hand astride a line wire as in Fig. 12.

From the above it will be noticed that my machine operates on the step-by-step principle,—that is, in place of the line-wires and the finished product moving continuously at a given rate of speed they move intermittently,—pausing during the time a new stay-wire is being inserted and then moving forward the distance required to make the mesh of the desired width.

The main shaft revolves continuously at a constant rate of speed during the time the machine is in motion, and the various cams and other devices are so timed and adjusted that the various operations follow each other in progressive succession and with absolute exactitude from start to finish.

The construction and operation of the machine being as above described, it will be noted that fencing of various heights or widths may be made by simply omitting one or more of the line-wires and changing the position of the right-hand marginal coiler.

Having now fully shown and described my invention what I claim and desire to secure by Letters Patent of the United States, is—

1. In a machine of the character described, the combination of a frame comprising end members and ties connecting the end members, a bed-plate connecting the end members, a plurality of horizontally disposed loopers mounted on the bed-plate, said loopers being arranged to operate alternately right and left to form alternately right and left loops in the line-wires, means for shooting a stay-wire through all of the loops in the line-wires, means for severing the stay-wire at the proper length, and means for twisting the ends of the stay-wires around the marginal line-wires, all substantially as shown and described.

2. In a wire-fence machine operative by power, comprising in combination, a frame, a bed-plate carried by the frame, a bulldozer mounted in the upper portion of the frame parallel with the bed-plate, said bulldozer comprising a large drum and a plurality of smaller drums meshing with the large drum, said bulldozer being adapted to crimp and advance the finished product and at the same time advance the line wires across the face of the bed-plate, means carried by the bed-plate for forming loops in the line-wires, the loops in each alternate wire being twisted alternately to the right and to the left, and means for inserting a stay-wire through said loops, all substantially as shown and described.

3. In a machine of the character described, the combination of a suitable frame, a bed-plate carried horizontally and longitudinally of the frame, a gate so timed that its face alternately approaches and moves away from the face of the bed-plate, there being a channel formed in the contact face of the gate which channel forms an opening for the line wires extending from end to end of the bed-plate when the gate is closed to its farthest limit rearward, all substantially as shown and described.

4. In a machine of the character described, the combination of a suitable frame, a bed-plate carried horizontally and longitudinally of the frame, a gate so timed that its face alternately approaches and moves away from the face of the bed-plate, there being a groove formed in the rear face of the gate which groove forms a channel when the gate is closed through which channel the stay-wire may be inserted, there also being cross notches intersecting the channel, the cross-notches being formed to receive the line-wires, said cross notches being located immediately in the rear of the gate when the gate is closed.

5. In a machine of the character described, the combination of a suitable frame, a bed-plate carried by the frame, a gate having a face adapted to alternately contact with and move away from the face of the bed-plate, there being a channel formed in the rear face of the gate into which the stay-wire may be projected, means for advancing line-wires at right-angles to the bed-plate through and across said channel, means for forming loops in the line-wires, and means for projecting the stay-wire through said channel and through said loops formed in the line-wires, all substantially as shown and described.

6. In a fence machine, a bed-plate, a face-plate secured to the bed-plate, intermediate twisters or loop-forming devices rotatably mounted in the bed-plate and extending through the face-plate, means for moving the twisters endwise, a mutilated gear mounted on the rear portion of each of the twisters, and a rack for operating said gears, certain of the gears being geared to rotate opposite to that of the others, means for shooting a stay-wire through the right and left hand loops formed by the loopers in the stay-wires, and means for twisting the ends of the stay-wires around the marginal line-wires, substantially as set forth.

7. In a wire fence machine, the combination of a plurality of loopers over the face of each of which a line-wire is drawn, mechanisms for simultaneously rotating the loopers to form loops in the line-wires, each alternate looper rotating opposite to that next thereto in order to form alternate right and left hand loops, means for inserting a stay-wire through all of the loops formed in the intermediate line-wires, and means for twisting the ends of the stay-wires around the marginal line-wires, all substantially as shown and described.

8. In a wire fence machine having end members, a bed-plate connecting the end members, a face-plate secured on the face of the bed-plate, there being a series of transverse notches formed across in the face of the face-plate, also there being looper apertures formed horizontally through the bed-plate and the face-plate and centrally of said notches, a gate adapted to contact with the face of the face plate, there being a channel formed in the face of the gate and longitudinally thereof, a looper located revolubly in each of said looper apertures, means for revolving certain of the loopers to the right and at the same time revolving certain other of the loopers to the left, all substantially as shown and described and for the purposes set forth.

9. In a wire fence machine comprising in combination a frame, a bed-plate carried by the frame, said bed-plate being characterized by having a comparatively large channel formed from end-to-end thereof in its rear face, a double offset rack mounted to slide longitudinally in said channel, gears on which the upper member of the rack operates to turn them in one direction, other gears alternating with the first-named gears on which the lower member of the rack operates to turn them in the direction opposite to the first named gears, a looper slidable through the center of each of said gears, and means for operating said loopers endwise, substantially as set forth.

10. In a wire fence machine having in combination a frame, a bed-plate carried by the frame and having a channel formed in its rear face longitudinally thereof, a two-part offset rack mounted to slide endwise in said channel, a face-plate secured to the face of the bed-plate, said face-plate having notches across its face, the bed-plate and the face-plate also having looper apertures extending therethrough horizontally at right-angles to the bed-plate, each of said apertures terminating in front in the center of one of said notches, all substantially as shown and described.

11. In a machine of the character described, the combination of a suitable framework, a bed-plate carried horizontally and longitudinally of the framework, a gate having a face adapted to be moved toward and away from the bed-plate, there being a channel formed in the contact face of the gate and extending longitudinally thereof, a face-plate secured to the bed-plate, there being cross notches formed in the face of the face-plate to allow the line-wires to be drawn therethrough at right angles to the stay-wire, means for forming loops in the line-wires at the crossings of said channel and said notches, and means for projecting a stay-wire through the loops so formed, each alternate loop being turned oppositely to that next thereto, all substantially as shown and described.

12. In a machine for making wire-fabric, comprising a frame having two end members spaced apart, a bed-plate connecting the end members, means for connecting the end members independent of the bed-plate, a bulldozer mounted between the upper portions of the end members, said bulldozer being composed of three or more drums formed of tubing spaced apart and means for gearing the three members of the bulldozer to operate together and in meshing contact with each other, a reel revolubly mounted between the end members, a main-shaft for transmitting power to the various devices, and means for operating the bulldozer, the reel, and the main shaft by power, all substantially as shown and described.

13. In a wire fence machine, the combination of mechanisms for carrying a plurality of line-wires, mechanisms for forming loops in the line-wires, mechanisms for shooting a stay-wire through all of said loops whereby when tension is applied the intersections of the line-wires with the stay-wires will appear as being entwined, each alternate loop in a row being turned to the right, the others to the left, and means for coiling the ends of the stay-wires around the marginal line-wires, all substantially as shown and described.

14. In a wire fence machine, the combination of a frame, a bed-plate carried by the frame, a series of wire loopers carried by the bed-plate and arranged in a row horizontally, each alternate looper being adapted to engage a line-wire disposed vertically thereacross and form a loop therein, each alternate looper being geared to form a right-hand loop and the other loopers being geared to form left-hand loops, means for shooting a stay-wire through all of said loops, means for severing the stay-wire to the proper length, and means for twisting the ends of the stay-wires around the marginal line-wires, the marginal line-wires not being provided with loops, all substantially as shown and described.

15. In a wire-fence machine having in combination, means for advancing a series of line-wires, a bulldozer for spacing, crimping, and for advancing the line-wires, a series of loopers for forming alternately right and left-hand loops in the intermediate line-wires, means for shooting a stay-wire through the loops formed in the line-wires, means for forming the line-wires of proper lengths, means for coiling the ends of the stay-wires around the marginal line-wires, and means for repeating these operations indefinitely, all substantially as shown and described.

16. In a wire-fence machine, the combination of a plurality of loopers arranged parallel with each other, a gear rack for rotating said loopers, each alternate looper being rotated to the right while the remaining loopers are rotated to the left in order to form alternate right and left loops in the intermediate line-wires, means for shooting a stay-wire through all of the loops formed at one time by said loopers, means for coiling the ends of the stay-wires around the marginal line-wires, and means whereby said operations may be repeated automatically and continuously, all substantially as shown and described.

17. In a machine of the character described, the combination of a suitable frame, a bed-plate carried horizontally across the frame, a face-plate secured to the face of the bed-plate, a gate adapted to contact with and to move away from the face of the face-plate, there being a groove formed in the face of the gate which when the gate is contacted with the face plate will form a channel from end to end of the gate, a series of horizontally disposed intermediate loopers whose heads cross said channel, means for advancing the line-wires upward between the faces of the bed-plate and the gate in position to be engaged by said loopers, and means for shooting a stay-wire through said channel when the gate is in contact with the bed-plate, all substantially as shown and described.

18. In a machine of the character described, the combination of a suitable frame, a bed-plate carried by the frame, a face-plate carried on the face of the bed-plate, means for advancing a series of line-wires upward across the face of the face-plate, means for shooting a stay-wire across the line-wires and parallel with the bed-plate, a horizontally disposed looper head for each intermediate line-wire the same being adapted to form loops in the line-wires through which the stay-wires are disposed, and vertically disposed twisters for the marginal line-wires for twisting the ends of the stay-wires around the marginal line-wires, all substantially as shown and described and for the purposes set forth.

19. In a machine of the character described, the combination of a suitable frame, a bed-plate disposed horizontally across the frame, horizontally disposed loopers mounted to rotate in the bed-plate, each alternate looper being mounted to rotate to the right and the others to the left, means for advancing a series of line-wires upward across the bed-plate, means for bringing each of the line-wires into contact with the face of one of the said loopers by which a loop is formed in each of the line-wires, the loops in alternate wires being turned to the right and the others to the left, and means for shooting a stay-wire parallel with the bed-plate and disposing it through the loops formed in all of the intermediate line-wires, all substantially as shown and described.

20. In a wire fence machine having a frame, a bed-plate mounted in the frame and having a channel formed in its rear face longitudinally thereof, a two-part rack slidably mounted in said channel, a face-plate secured to the face of the bed-plate, there being looper apertures formed horizontally through the bed-plate and corresponding apertures being formed through the face plate, a looper revolubly mounted in each of said apertures and adapted to be moved endwise, a gear wheel mounted on the rear of each looper with the looper adapted to be moved endwise therein, means for retaining said gears in engagement with said rack, each alternate gear being in engagement with the upper member of the rack and the other gears being in engagement with the lower members of the rack, means for rotating the loopers to form loops in the intermediate line-wires, means for shooting a stay-wire through the loops formed by the loopers, means for severing the stay-wire at the proper point, and means for twisting the ends of the stay-wire around the marginal line-wires, substantially as set forth.

21. In a wire fence machine comprising in combination a frame, a bed-plate mounted in the frame and having a channel formed in its rear side longitudinally thereof, a two-part offset rack mounted to slide endwise in said channel, a face-plate secured to the face of the bed-plate, there being a series of looper apertures formed horizontally and transversely through said bed-plate, a spool revolubly mounted in each of said apertures with means whereby they may not be moved endwise, a gear wheel secured on the rear end of each of said spools, said gear-wheels being in mesh alternately with the upper and the lower member of said rack, a looper disposed through each of said thimbles or spools and gear-wheels with their heads extending through apertures therefor in the face plate, means whereby said loopers may be moved endwise forward and backward together, a gate adapted to contact with the face of the face plate, hands having fingers adapted to stride each of the line wires, and means for shooting the stay-wire through the loops formed by said loopers, all substantially as shown and described.

22. In a fence-machine, a bed-plate having a channel formed longitudinally and in the rear face thereof, an offset rack slidable endwise in said channel, a plurality of spools disposed horizontally across through the bed-plate, means for preventing endwise movement of said spools, a gear-wheel secured to the rear end of each of said spools, one half of said gear-wheels being in mesh with the upper member of the rack and the others being in mesh with the lower member of the rack, a looper disposed through each of said spools and gear-wheels, a face-plate secured to the face of the bed-plate there being apertures formed through said face-plate in alinement with said loopers for said loopers to operate in both longitudinally and revolubly, prongs formed on the forward ends of the loopers to engage a line wire and form a loop therein, a gate adapted to contact intermittently with the face of the face-plate, eye-clips for guiding the line-wires to the center of the heads of the loopers, and hands having fingers for guiding the line-wires above said loopers, all substantially as shown and described.

23. In a wire-fence machine, the combination of a bed-plate having a channel formed in its rear face, an offset rack slidable in said channel, a face-plate carried by the forward face of the bed-plate, gears meshing with said rack each adapted to rotate a looper which extends through the bed-plate, means for moving said loopers endwise forward and backward, means for retaining said gears from moving forward and backward but allowing them to rotate, a gate having a channel in its contact face to receive a stay-wire, a hand for each of the line-wires, each hand being provided with fingers to stride the line-wire, means for resiliently retaining the hands in position, means for cushioning their downward movements, and means for moving the line-wires step-by-step, all substantially as shown and described.

24. In a wire-fence machine, the combination with a bed-plate having a plurality of apertures formed across therethrough, a spool or thimble mounted revolubly in each of said apertures, a gear-wheel secured on the rear end of each of said spools or thimbles, an upper rack member mounted in the bed-plate and meshing with each alternate gear-wheel, a lower rack member meshing with the other alternate gear-wheels, means for reciprocating the rack to revolve said spools or thimbles, a twister carried revolubly by each of said gears, means for moving said twisters endwise independent of the rotary movements, a face-plate secured to the front of the bed-plate and having apertures therethrough through which the working end of said twisters may operate, a gate adapted to contact with said face-plate, hands for guiding the line wires to position to be engaged by the twisters, means for shooting a stay-wire through the loops formed in the line-wires by said twisters, and means for operating all of the parts in progressive sequency from a single source of power, all substantially as shown and described.

In testimony whereof I have hereunto subscribed my name in the presence of two subscribing witnesses.

WILLIAM N. PARRISH.

Witnesses:
R. E. RANDLE,
R. W. RANDLE.